(12) United States Patent
Yamazaki

(10) Patent No.: US 12,128,844 B2
(45) Date of Patent: Oct. 29, 2024

(54) OCCUPANT PROTECTION SYSTEM

(71) Applicant: Daicel Corporation, Osaka (JP)

(72) Inventor: Masayuki Yamazaki, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/766,183

(22) PCT Filed: Apr. 21, 2020

(86) PCT No.: PCT/JP2020/017203
§ 371 (c)(1),
(2) Date: Apr. 1, 2022

(87) PCT Pub. No.: WO2021/065061
PCT Pub. Date: Apr. 8, 2021

(65) Prior Publication Data
US 2024/0051488 A1 Feb. 15, 2024

(30) Foreign Application Priority Data
Oct. 1, 2019 (JP) .................. 2019-181692

(51) Int. Cl.
*B60R 21/013* (2006.01)
*B60R 21/017* (2006.01)
(Continued)

(52) U.S. Cl.
CPC .......... *B60R 21/017* (2013.01); *B60R 21/013* (2013.01); *B60R 21/264* (2013.01); *B60R 21/268* (2013.01); *B60R 2021/01231* (2013.01); *B60R 2021/01286* (2013.01); *B60R 2021/26029* (2013.01)

(58) Field of Classification Search
CPC . B60R 21/013; B60R 21/0134; B60R 21/017; B60R 21/264; B60R 21/2642; B60R 21/2644; B60R 21/2646; B60R 21/2648; B60R 21/268; B60R 21/272;
(Continued)

(56) References Cited

U.S. PATENT DOCUMENTS 6,286,862 B1 9/2001 Blank et al.
2002/0166710 A1 11/2002 Breed
(Continued)

FOREIGN PATENT DOCUMENTS

DE 19743304 A1 4/1999
DE 102007044039 A1 3/2009
(Continued)

OTHER PUBLICATIONS

English translation of Office Action issued in counterpart German Patent Application No. 112020004717.2 dated Apr. 17, 2023.
(Continued)

*Primary Examiner* — Erick R Solis
(74) *Attorney, Agent, or Firm* — Morgan, Lewis & Bockius LLP

(57) ABSTRACT

The present disclosure provides an occupant protection system protecting an occupant in a vehicle by a protection device provided in the vehicle the occupant protection system having a gas generator, a prediction unit, and a control unit.

20 Claims, 10 Drawing Sheets

(51) Int. Cl.
*B60R 21/264* (2006.01)
*B60R 21/268* (2011.01)
*B60R 21/01* (2006.01)
*B60R 21/26* (2011.01)

(58) Field of Classification Search
CPC ...... B60R 21/2725; B60R 2021/01231; B60R 2021/26029; B60R 2021/2685
USPC .......................................................... 701/45
See application file for complete search history.

(56) References Cited

U.S. PATENT DOCUMENTS

| | | | |
|---|---|---|---|
| 2005/0151356 A1 | 7/2005 | Ohji et al. | |
| 2007/0228704 A1* | 10/2007 | Cuddihy | B60R 21/0132 280/742 |
| 2009/0008913 A1 | 1/2009 | Breuninger et al. | |
| 2009/0008914 A1 | 1/2009 | Breuninger et al. | |
| 2010/0264632 A1 | 10/2010 | Bacher et al. | |
| 2013/0184939 A1 | 7/2013 | Shigemura | |
| 2013/0334800 A1 | 12/2013 | Yamazaki et al. | |
| 2018/0208141 A1* | 7/2018 | Mase | B60R 21/0134 |
| 2021/0016735 A1* | 1/2021 | Radetzki | G08G 1/163 |
| 2021/0086714 A1* | 3/2021 | Heinrich | B60R 21/01538 |

FOREIGN PATENT DOCUMENTS

| | | |
|---|---|---|
| DE | 102008037812 A1 | 6/2009 |
| DE | 102013003667 A1 | 3/2014 |
| DE | 102018100232 A1 | 7/2019 |
| JP | H08-198044 A | 8/1996 |
| JP | 3965050 B2 | 8/2007 |
| JP | 2008-049718 A | 3/2008 |
| JP | 2009-520628 A | 5/2009 |
| JP | 2011-201412 A | 10/2011 |
| JP | 2013-141950 A | 7/2013 |
| JP | 2013-256227 A | 12/2013 |

OTHER PUBLICATIONS

International Search Report issued in corresponding International Patent Application No. PCT/JP2020/017203 dated Jun. 23, 2020.
International Preliminary Report on Patentability and Written Opinion issued in corresponding International Patent Application No. PCT/JP2020/017203 dated Apr. 14, 2022.

* cited by examiner

OCCUPANT PROTECTION SYSTEM

TECHNICAL FIELD

The present invention relates to an occupant protection system that protects an occupant in a vehicle.

BACKGROUND ART

It is known to use protection devices such as various airbags to protect occupants from the impact of collision in vehicles. For example, various types of airbag devices such as a front side collision airbag that is inflated from a steering wheel, an instrument panel, or the like toward a front side of an occupant; a knee protection airbag (a knee bag) that is inflated at a lower portion of a steering column; a side collision airbag that is inflated from the seat side portion toward the side of the occupant; and a curtain airbag that is inflated along side door glass have become widespread. In addition to the airbag device, seatbelt devices that increase the tension of the seatbelt such that the occupant is restrained in a suitable position in the seat upon detection of a collision are also known as protection devices.

Here, to protect the occupant from the impact of a collision by the protection device, appropriate protection pressure needs to be applied to the occupant in accordance with the protection mode of the protection device. When the protection pressure deviates from a predetermined pressure range, the occupant may not be suitably protected or an excessive impact is applied to the occupant. Thus, for example, two igniters are provided in the gas generator described in Patent Document 1, and after the collision is detected, their ignition timings are adjusted and the pressure inside the airbag is adjusted by the generating gas, thereby adjusting the protection pressure at which the airbag is applied on the occupant. In the technology disclosed in Patent Document 2, the pressure inside the airbag is adjusted similarly by controlling the actuation of two gas generators after the collision is detected.

CITATION LIST

Patent Document

Patent Document 1: JP 3965050 B
Patent Document 2: JP 2013-256227 A
Patent Document 3: JP 2009-520628 A

SUMMARY OF INVENTION

Technical Problem

To protect the occupant in a vehicle from the impact of a collision with a protection device, it is necessary to restrain the occupant at an appropriate protection pressure. According to a known technique, with a collision between a vehicle and an obstacle, as a trigger, an actuation of two igniters included in one gas generator or two gas generators is controlled. In such a configuration, the timing of generation of the gas for inflating the airbag is after a certain period of time has elapsed from the detection of the collision, and therefore the airbag cannot necessarily act (contact) on the occupant at an appropriate pressure. That is, because the gas generated by the two igniters and the like is combined to apply pressure by the airbag to the occupant, the applicable pressure range is limited.

Furthermore, the configuration requiring two igniters or the like makes the protection device mechanically complicated or the device tends to easily become larger. Therefore, it is difficult to provide a protection device that is suitable also from a point of view of cost.

In view of the problems described above, an object of the present disclosure is to provide a technique for applying a suitable protection pressure to an occupant by a simpler method when protecting the occupant in a vehicle from the impact of a collision by a protection device.

Solution to Problem

To solve the above problems, the present disclosure actuates the gas generator at an actuation timing that is earlier than the predicted collision timing such that the protection pressure applied on the occupant by actuation of the protection device and its action timing become suitable for the occupant in a case where the collision between the vehicle and an obstacle is predicted. By performing such actuation control of the gas generator, a suitable pressure can be applied to the occupant by the protection device at a suitable timing even when the number of gas generators is one.

More specifically, the present disclosure is an occupant protection system protecting an occupant in a vehicle by a protection device provided in the vehicle, the occupant protection system including: a gas generator including an igniter ignited by an ignition signal and generating gas due to actuation of ignition of the igniter, the gas generator configured to actuate the protection device with gas generated by the gas generator; a prediction unit configured to predict a collision between the vehicle and an obstacle present around the vehicle; and a control unit configured to control supply of the ignition signal to the igniter based on a prediction result by the prediction unit. Then, the protection device is configured to be actuated via a pressure applied to a predetermined space with gas generated by the gas generator and fed into the predetermined space in the protection device. The control unit includes a calculation unit configured calculate a protection pressure applied on the occupant by the protection device to protect the occupant and to calculate a protection timing at which the protection pressure is applied on the occupant, and an actuation control unit configured to actuate the gas generator at an actuation timing earlier than a collision timing predicted by the prediction unit in a manner that the protection pressure is applied at the protection timing by the protection device based on pressure data related to pressure transition of the gas in the predetermined space when the ignition signal is supplied to the igniter.

The occupant protection system of the present disclosure is a system that protects an occupant in a vehicle by a protection device. The protection device is not limited to one having a specific configuration, but is configured in a manner that the protection device is actuated via the pressure of the gas applied in a predetermined space with the gas generated by the gas generator being fed into the predetermined space provided in the protection device or included in the protection device. Examples of the protection device include an airbag device that is supplied with gas generated by the gas generator and inflated to a predetermined inflation shape, and a seatbelt device that restrains the occupant to the seat by supplying gas generated by the gas generator to pull the seatbelt. By transmitting gas pressure in a predetermined space to an occupant, such protection devices can protect the occupant from impact during the collision between the vehicle and the obstacle.

Here, the occupant protection system includes a prediction unit. Using known techniques, the prediction unit can predict a collision between the vehicle and an obstacle, for example, a collision timing at which a collision with an obstacle occurs, whether or not to be able to avoid a collision with the obstacle, and the like. For example, the prediction unit can perform collision prediction based on a relative distance, relative speed, and the like between the vehicle and a surrounding obstacle detected by using a camera that captures the travel direction of the vehicle, the LIDAR technology using short-wavelength electromagnetic waves such as near infrared waves, and the like. In the occupant protection system described above, the control unit controls the supply of an ignition signal to the igniter for actuating the protection device based on the prediction result by the prediction unit.

Here, the control unit includes a calculation unit and an actuation control unit, for controlling the supply of the ignition signal to the igniter. The calculation unit calculates a protection pressure applied on the occupant by the protection device for occupant protection, that is, the pressure applied on the occupant due to the gas generated by the gas generator, and the protection timing at which the protection pressure is applied on the occupant. To achieve occupant protection by the protection device, it is important to apply, to the occupant at a timing suitable for the protection, pressure to suitably protect the occupant without harming the occupant. This protection pressure and protection timing may vary depending on the form of occupant protection by the protection device. Furthermore, the protection pressure and the protection timing can be adjusted in accordance with physical parameters associated with the occupant movement at the time of collision, for example, parameters associated with inertial forces acting in the travel direction (vehicle speed, occupant weight, and the like), and the distance to and arrangement of the equipment in the vehicle with which the occupant's body can come into contact.

Using pressure data related to the pressure transition of the gas in the predetermined space stored in advance, the actuation control unit supplies an ignition signal to the igniter to actuate the gas generator at an actuation timing earlier than the collision timing in a manner that the protection device performs occupant protection at a protection pressure calculated by the calculation unit and at the protection timing. In other words, based on the transition of the pressure effect in the predetermined space with the gas generated by the gas generator assumed in advance, the actuation control unit determines a suitable actuation timing of the igniter, and supplies the ignition signal at the actuation timing. With such a configuration, by adjusting the actuation timing of one igniter just before and after a timing earlier than the collision timing, a desired protection pressure can be applied to the occupant at a desired protection timing, making it possible to apply an appropriate pressure to the occupant via the protection device with a simple method.

Here, in the occupant protection system described above, the pressure data may include data related to a peak timing in which pressure of gas in the predetermined space reaches a peak value after the ignition signal is supplied to the igniter, and a pressure transition in the predetermined space at and after the peak timing, and more specifically, a downward transition of pressure. That is, by including at least these data, the actuation timing for actuating the gas generator can be suitably determined.

In the occupant protection system described above, the pressure data may be formed as data related to a pressure transition of the gas in the predetermined space, in a manner corresponding to the temperature of the gas generator. Then, the actuation control unit may actuate the gas generator at the actuation timing based on the temperature of the gas generator. According to such a configuration, even if the temperature around the gas generator fluctuates, the actuation timing is suitably determined in accordance with the surrounding temperature, and the gas generator is actuated. More specifically, as the gas generation characteristic, the gas generator is susceptible to the surrounding temperature, the occupant can be suitably protected by actuating the gas generator based on the surrounding temperature in this manner.

In the occupant protection system described above, the calculation unit may calculate the protection pressure based on the weight of the occupant. The inertial force applied to the occupant at the time of collision is greatly affected by the occupant's weight. Therefore, to achieve suitable occupant protection, it is preferable to determine the protection pressure in consideration of the occupant's weight.

Here, in the occupant protection system described above, various configurations of devices can be employed as the protection device, and the actuation control of the gas generator can be performed by the control unit in accordance with the device configuration. Examples of the configurations will be given below. First, as a first device configuration, the protection device may be an airbag device that is supplied with gas generated by the gas generator and inflated into a predetermined inflation shape. In that case, the predetermined space is an inflation space in the airbag device, and the pressure data is related to a pressure transition of gas in the inflation space. The calculation unit may calculate the protection pressure applied to the occupant when the airbag device is inflated to the predetermined inflation shape and comes into contact with the occupant, and the protection timing for the airbag device to come into contact with the occupant, and the actuation control unit may actuate the gas generator at the actuation timing based on the protection timing and the pressure data.

In such a device configuration, the control unit performs actuation control of the gas generator such that the protection pressure at the time of contact between the airbag device inflated by supplying gas to a predetermined space of the airbag device and the occupant is applied at a timing appropriate to protect the occupant from the impact at the time of collision. As a result, safe and reliable protection of the occupant is possible by the inflation of the airbag device by a simple method.

In a configuration using an airbag device, the actuation control unit may further actuate the gas generator at the actuation timing based on the travel speed of the vehicle. The higher the travel speed of the vehicle becomes, the shorter the time (hereinafter referred to as "contact reach time") until the occupant comes into contact with the inflated airbag device after the collision. By determining the actuation timing in consideration of the contact reach time, more suitable occupant protection can be achieved.

Next, as a second configuration, the protection device may be a seatbelt device that restrains an occupant to a seat with gas generated by the gas generator being supplied to pull a seatbelt. In that case, the predetermined space may be a pressure space in which pressure is applied with the gas to cause the seatbelt to apply a restraining force on the occupant, and the pressure data may be data related to a pressure transition of gas in the pressure space. The calculation unit may calculate the protection pressure applied on the occupant when the seatbelt restrains the occupant to the seat by applying pressure with the gas, and the protection timing for the seatbelt to restrain the occupant, and the actuation control unit may actuate the gas generator at the actuation timing based on the protection timing and the pressure data.

In such a device configuration, gas is supplied into a predetermined space of the seatbelt device, thereby applying pressure to the seatbelt to move the seatbelt to restrain the occupant. Then, the control unit performs actuation control of the gas generator, and thus the protection pressure when the occupant is restrained to the seat by the seatbelt is applied on the occupant at a timing appropriate to protect the occupant from the impact at the time of collision. As a result, safe and reliable protection of the occupant is possible by the seatbelt device by a simple method. Note that, as an example of the seatbelt device, the predetermined space may be a pressure space for applying pressure with gas to a piston slidably connected to an end portion of the seatbelt to slide the piston.

The occupant protection system described above may further be configured to protect the occupant with an airbag device that is inflated into a predetermined inflation shape. The occupant protection system may further include a second gas generator that includes a second igniter ignited by a second ignition signal, and configured to generate gas due to actuation of the second igniter and to actuate the airbag device via a pressure applied to an inflation space with gas generated by the second gas generator being fed into the inflation space in the airbag device. In such a case, the control unit controls supply of the ignition signal to the igniter and the second ignition signal to the second igniter, based on the prediction result from the prediction unit, the calculation unit may further calculate a second protection pressure applied on the occupant when the airbag device is inflated into the predetermined inflation shape and comes into contact with the occupant, and calculates a second protection timing for the airbag device to come into contact with the occupant, and the actuation control unit may actuate the gas generator at the actuation timing based on the pressure data in a manner the protection pressure is applied on the occupant by the seatbelt at the protection timing after the collision timing and before the second protection timing, and further actuates the second gas generator at a second actuation timing based on second pressure data related to a pressure transition of gas in the inflation space when the second ignition signal is supplied to the second igniter in a manner that the airbag device and the occupant come into contact with each other at the second protection timing to apply the second protection pressure on the occupant.

That is, as protection devices, the occupant protection system includes both the seatbelt device and the airbag device. In such a configuration, the control unit controls the actuation of each of the seatbelt device and the airbag device. More specifically, the actuation control unit performs actuation control of the gas generator and a second gas generator such that pressure (protection pressure and second protection pressure) by each device is applied on the occupant at a timing (protection timing and second protection timing) suitable for occupant protection by each device. As a result, safe and reliable protection of the occupant is possible by the seatbelt device and the airbag device by a simple method.

Note that in the occupant protection system described above, the actuation timing and the second actuation timing are both timings before the collision timing, and the actuation timing may be a timing earlier than the second actuation timing. As a result, the occupant can enjoy protection by the airbag device in a state of being suitably restrained to the seat by the seatbelt device, thereby providing a technique contributing to securing of safety of the occupant.

Advantageous Effects of Invention

According to the present disclosure, a suitable pressure can be applied to an occupant by a simpler method when protecting the occupant in a vehicle from the impact of a collision by a protection device.

DESCRIPTION OF EMBODIMENTS

Hereinafter, aspects of an occupant protection system according to an embodiment will be hereinafter described with reference to the drawings. Note that each of the configurations, combinations thereof, and the like in each embodiment is an example, and various additions to the configuration, omissions, substitutions, and other changes may be made as appropriate without departing from the spirit of the present invention. The present disclosure is not limited by the embodiments and is limited only by the claims.

First Embodiment

Figure 1:
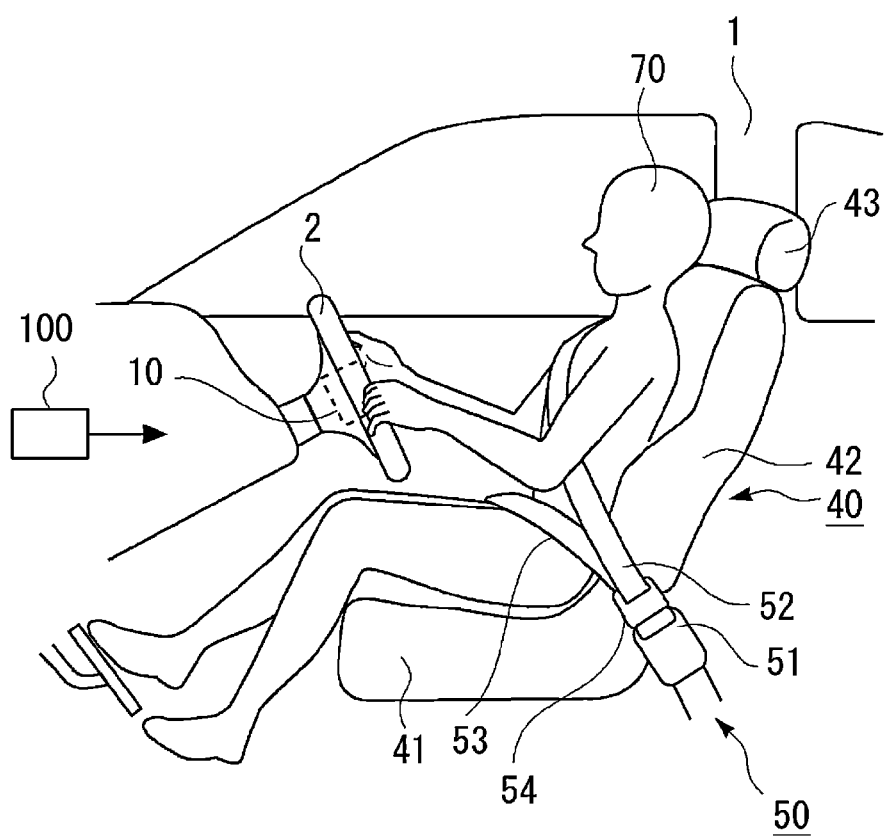
FIG. 1 is a first view illustrating a state of an occupant on board a vehicle.
Figure 2:
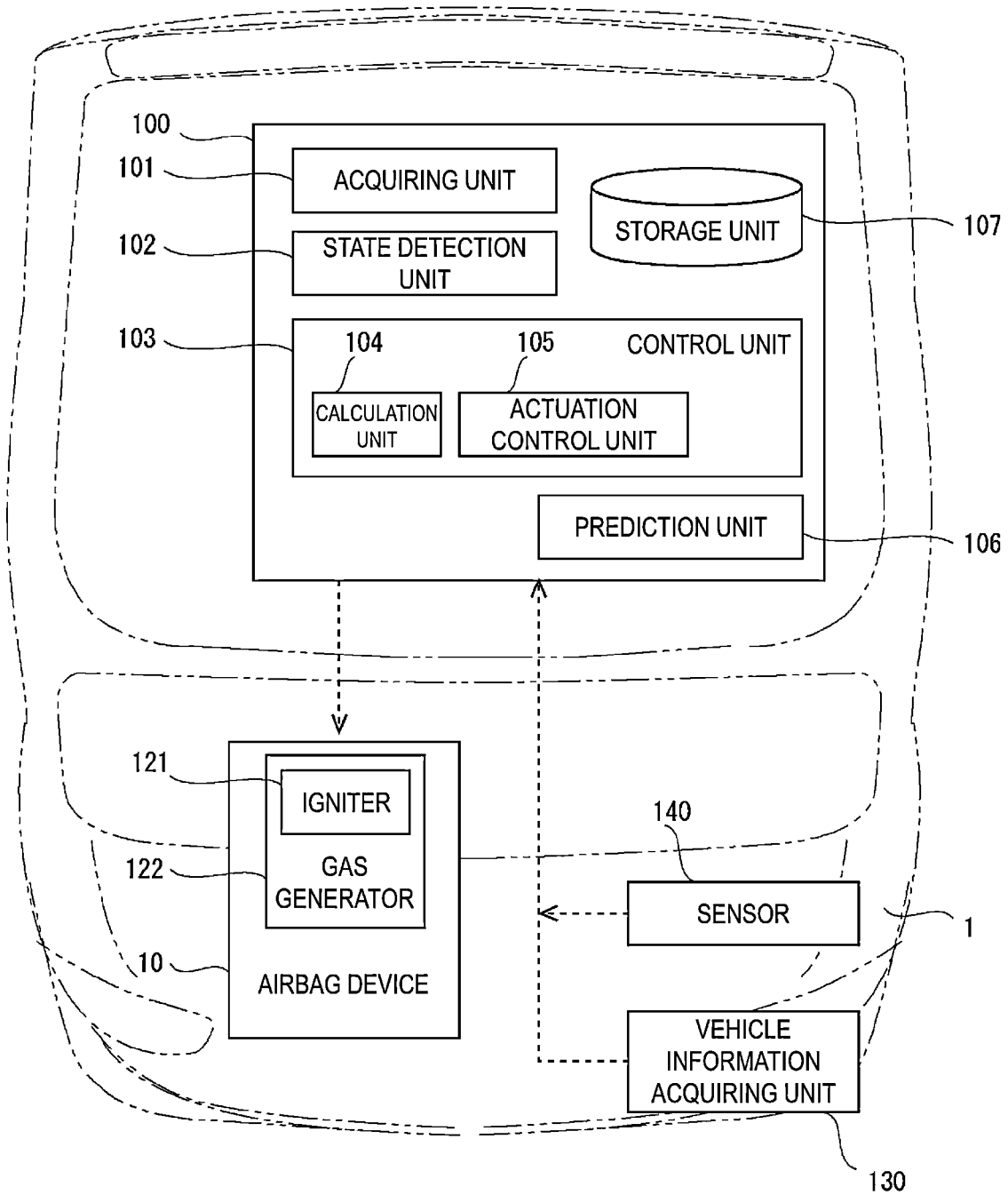
FIG. 2 is a view illustrating a functional block related to an occupant protection system installed in a vehicle.

An occupant protection system according to a first embodiment will be described. FIG. 1 illustrates a state of an occupant 70 who is on board a vehicle 1 and driving a vehicle 1. FIG. 2 is a functional block view for actuation control of an airbag device 10 formed in a control device 100 included in the vehicle 1, as an occupant protection system. The airbag device 10 corresponds to the protection device in the present application.

As illustrated in FIG. 1, the occupant 70 is driving the vehicle 1 in a state of being seated on a seat 40. The seat 40 is configured such that a seat back 42 is reclinable against a seat cushion 41 on which the occupant is seated. A headrest 43 is connected to the seat back 42. In the state illustrated in FIG. 1, the occupant 70 is driving the vehicle 1 via a steering wheel 2 in a state where the driver's head is placed on the headrest 43 and further most of the driver's body is placed on the seat back 42 and the seat cushion 41. A seatbelt device 50 is provided to ensure safety of the occupant 70, just in case of an accident occurring while the occupant 70 is driving the vehicle 1. The seatbelt device 50 is formed as a three-point seatbelt having a shoulder strap 52 and a lap strap 53. A metal tongue 54 through which these straps are passed is connected to a buckle 51, thereby bringing the body of the occupant 70 who is driving into a state of being restrained with respect to the seat 40.

Figure 3:
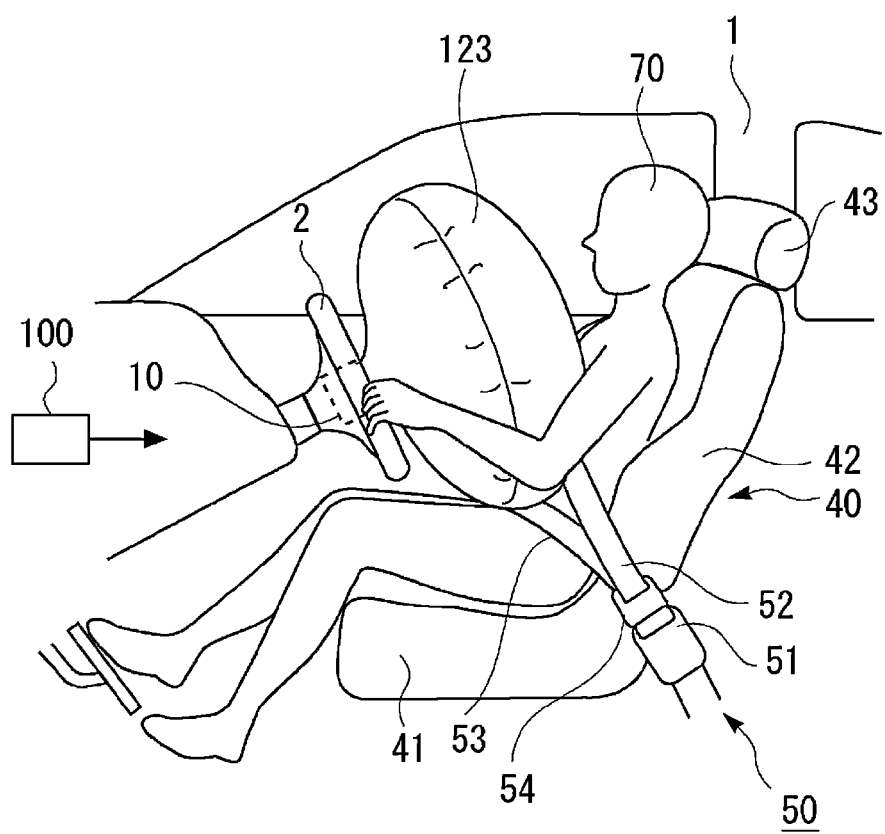
FIG. 3 is a second view illustrating a state of an occupant on board a vehicle.

In the vehicle 1, the airbag device 10 is arranged inside the steering wheel 2 for safety of the occupant 70. The airbag device 10 has a gas generator 122 including an igniter 121, and is configured in a manner that gas generated by combustion of a gas generating agent in the gas generator 122 is supplied to inflate an airbag 123 (see FIG. 3). That is, the interior space of the airbag 123 corresponds to the predetermined space in the present application. As the gas generating agent, for example, that having a single-perforated cylindrical shape consisting of guanidine nitrate (41 wt. %), basic copper nitrate (49 wt. %), and a binder or an additive can be used. As for the gas generator 122, a known hybrid type in which a pressurized gas and a gas generating agent are used in combination, or a known stored type that uses only a pressurized gas also can be used.

Before the airbag device 10 is actuated, that is, when there is no need to protect the occupant on the seat 40, the entire airbag device 10 is accommodated inside the steering wheel 2 in a state where the airbag 123 is folded. Then, when a collision between the vehicle 1 and an obstacle is predicted or when a collision occurs, an ignition signal is supplied to the igniter 121 of the airbag device 10 to protect the occupant 70 from the impact of the collision, and gas generated by the gas generator 122 is fed into the interior of the airbag 123 to inflate the airbag 123 (state of FIG. 3). Thereafter, the body of the occupant 70 thrown in the travel direction of the vehicle 1 is received by the inflated airbag 123 (state of FIG. 4). At this time, the airbag 123 is preferably inflated to the extent that the body of the occupant 70 does not move further forward and to the extent that excessive pressure is not applied to the body at the time of contact.

Figure 5:
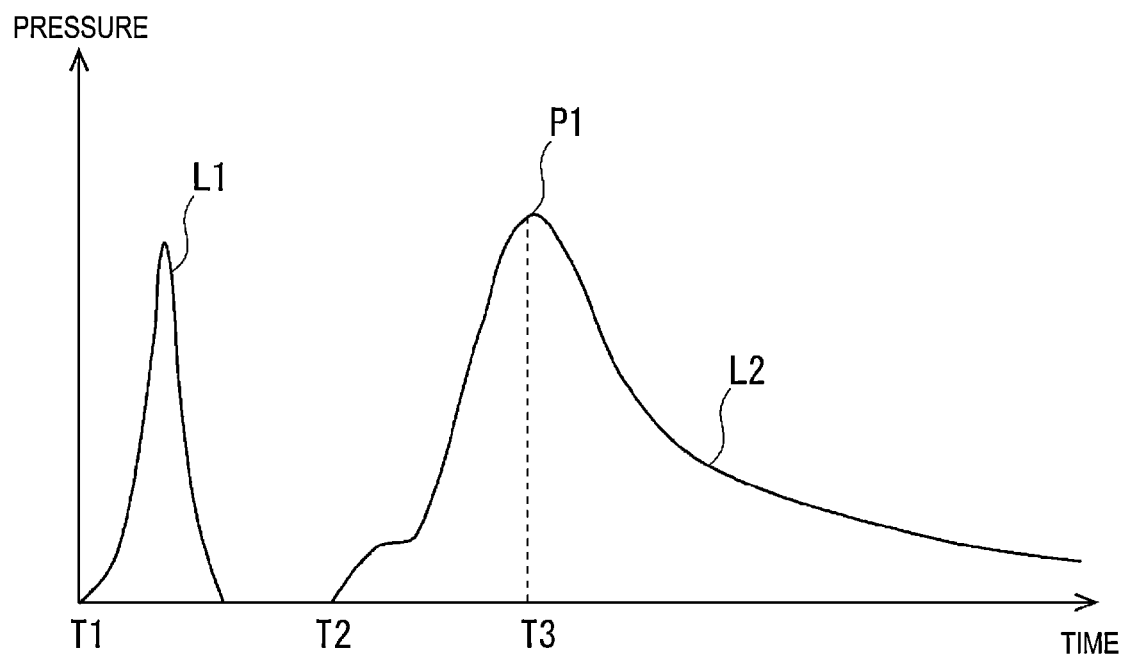
FIG. 5 is a first view showing a transition in gas pressure in an airbag of an airbag device.

Note that the airbag 123 is provided with a vent hole for discharging over time the gas supplied to the interior. Thus, the pressure inside the airbag 123 when gas is supplied by the gas generator 122 transitions as shown in FIG. 5. The horizontal axis in FIG. 5 represents time and the vertical axis represents pressure inside the airbag 123. Then, timing T1 is the time at which an ignition signal is supplied to the igniter 121. Here, when an ignition signal is supplied to the igniter 121, the gas generating agent inside the gas generator 122 starts combustion with a combustion product generated by the igniter 121. The thus generated gas slightly inflates the airbag 123, and that pressure breaks the airbag module and causes the airbag to be released (inflated) to the outside from the accommodating space of the steering wheel 2. Thus, the internal pressure of the airbag 123 drops soon after it temporarily rises (transition of line L1 shown in FIG. 5). On the other hand, the combustion of the gas generating agent continues, and the internal pressure of the airbag 123 starts to rise again at timing T2 by the generated gas, and then the internal pressure reaches a peak value at timing T3. The peak pressure at this time is P1. Thereafter, the internal pressure of the airbag 123 gradually decreases by the correlation among the supply flow rate of gas from the gas generator 122, the discharge flow rate of gas from the vent hole provided in the airbag 123, and the cooling of gas in the airbag 123 (transition of line L2 shown in FIG. 5). In view of such pressure transition, protection of the occupant 70 by the airbag device 10 is preferably performed.

Details of the control for protection of the occupant by the occupant protection system described above will now be described with reference back to FIG. 2. FIG. 2 is a functional block view for actuation control of the airbag device 10 formed in the control device 100 included in the vehicle 1, as the occupant protection system. The control device 100 includes, for example, a microcomputer, and each function is implemented by causing a central processing unit (CPU) (not illustrated) to execute a program stored in a storage means, (ROM) or the like (not illustrated).

FIG. 2 also illustrates a vehicle information acquiring unit 130 and a sensor 140 provided in the vehicle 1. The vehicle information acquiring unit 130 is a means for acquiring information regarding the travel state of the vehicle such as the speed and current position of the vehicle 1, and is typically configured to include a speed sensor and a GPS receiver. The information acquired by the vehicle information acquiring unit 130 is transmitted to the control device 100, and is used for control related to travel of the vehicle 1, for example, display of route in a car navigation device, protection control for protection of the occupant 70 when the vehicle 1 is traveling, and the like. The sensor 140 is a means for performing sensing for acquiring information necessary for the protection control, the information regarding structures (obstacles) around the vehicle, and is typically configured to include a stereo camera, a visible light camera, laser scanner, LIDAR, radar, and the like. The information acquired by the sensor 140 is also transmitted to the control device 100.

Here, the functional units of the control device 100 will be described. The control device 100 includes an acquiring unit 101, a state detection unit 102, a control unit 103, a prediction unit 106, and a storage unit 107. First, the acquiring unit 101 is a functional unit for acquiring environment information related to the vehicle 1 in traveling or the surrounding environment of the vehicle 1. The environment information is information related to a collision between the vehicle 1 and an obstacle present at the periphery thereof, and examples thereof include, for example, information related to traveling and steering of the vehicle 1, relative position information of the obstacle with respect to the vehicle 1, relative speed information, information related to the distance between the vehicle 1 and the obstacle, and the like. The acquiring unit 101 acquires the environment information regarding the situation surrounding the vehicle 1, using the data acquired by the vehicle information acquiring unit 130 and the sensor 140. Next, the state detection unit 102 is a functional unit that detects information regarding the state of the occupant 70 in the vehicle 1, for example, information related to the weight of the occupant 70, and information on the relative position of the occupant 70 seated on the seat 40 with respect to the structure (particularly the steering wheel 2) in the vehicle 1. Specifically, the state detection unit 102 detects the weight of the occupant 70 by a weight sensor provided in the seat 40, and detects a separation distance between the occupant 70 and the steering wheel 2 by a camera provided in the vehicle 1.

Next, the control unit 103 is a functional unit that controls the supply of the ignition signal to the igniter 121 included in the airbag device 10 based on the prediction result of the prediction unit 106 described below. In other words, in a case where it is determined that the airbag device 10 needs to be actuated to protect the occupant 70 as a result of the prediction by the prediction unit 106, the control unit 103 achieves the actuation by supplying an ignition signal to the igniter 121. To actuate the igniter 121, the control unit 103 includes a calculation unit 104 and an actuation control unit 105. More specifically, the calculation unit 104 is a functional unit that calculates a protection pressure that is suitable for protection of and applied on the occupant 70 when the airbag 123 of the airbag device 10 is inflated and a protection timing at which the protection pressure is applied. The actuation control unit 105 is a functional unit that supplies an ignition signal to the igniter 121 and actuates the gas generator 122, and thus the occupant 70 can be protected by the airbag device 10 at the protection pressure and protection timing calculated by the calculation unit 104. At this time, the actuation control unit 105 controls the actuation of the gas generator 122 based on the assumed pressure transition data in the airbag 123 with the gas generator 122 under actuation. The assumed pressure transition data is stored in the storage unit 107 described below. Details of the actuation control will be described later.

The prediction unit 106 is a functional unit that predicts a collision between the vehicle 1 and an obstacle. Specifically, the possibility of a collision is predicted based on the speed information of the vehicle 1, the separation distance between the obstacle and the vehicle 1, and the like serving as the environment information acquired by the acquiring unit 101. For example, it can be predicted that the shorter the time to collision which is calculated from the speed of the vehicle and the separation distance, the higher the possibility of a collision. When the time falls below a reference value, "occurrence of collision" is predicted. In this case, the prediction unit 106 also predicts and outputs the timing (collision timing) at which the collision occurs. The storage unit 107 is a functional unit that stores assumed pressure transition data shown in FIG. 5 and other assumed data in the airbag 123 with the gas generator 122 under actuation. Note that, of the pressure transition shown in FIG. 5, the transition of the pressure (i.e., of the protection pressure required for restraint of the occupant 70) actually related to inflation of the airbag 123 is indicated by line L2. Accordingly, the storage unit 107 is only required to store at least, of the pressure transition L2, the peak timing T3 reaching the peak pressure P1 and the data related to the pressure transition at and after the peak timing T3.

Figure 6:
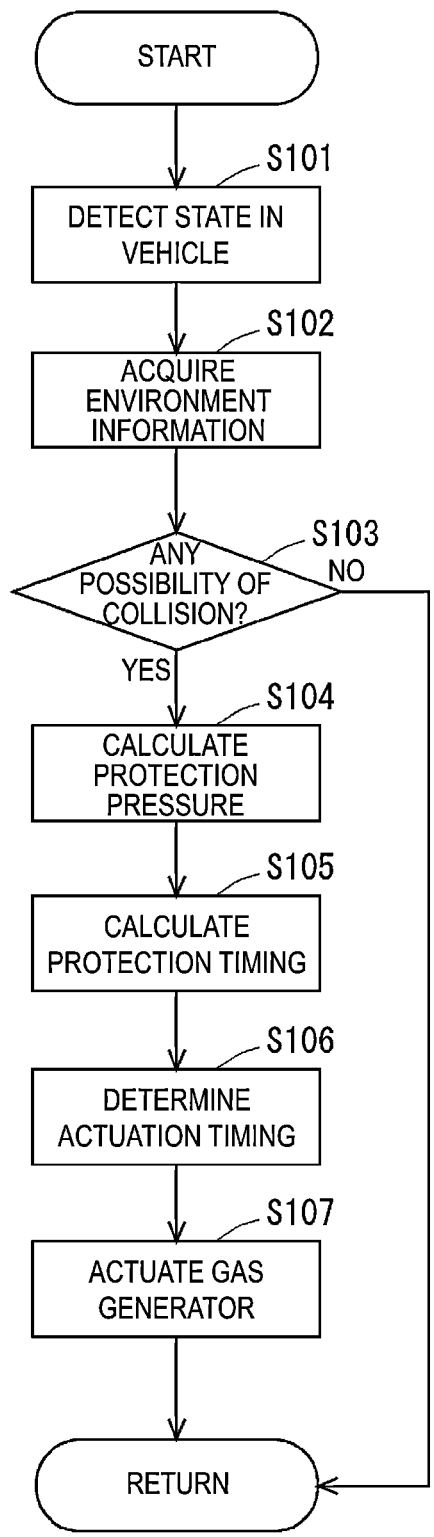
FIG. 6 is a flowchart related to actuation control of an igniter for occupant protection executed in the occupant protection system.

The actuation control of the airbag device 10 will now be described based on FIG. 6. This actuation control is repeatedly executed at predetermined intervals by the control device 100. First, in S101, information regarding the weight of the occupant 70 and the separation distance between the occupant 70 and the steering wheel 2 are detected by the state detection unit 102 as information regarding the state of the occupant 70 in the vehicle 1. The former is related to inertial force generated when the vehicle 1 collides with an obstacle, the latter is related to the contact reach time between the occupant 70 and the steering wheel 2 when a collision occurs. Next, in S102, the environment information is acquired by the acquiring unit 101. As described above, the environment information is travel information of the vehicle 1 and information related to the collision between the vehicle 1 and the obstacle around the vehicle.

Then, in S103, the prediction unit 106 determines whether or not there is a possibility of collision between the vehicle 1 and an obstacle. Note that the possibility of collision in the present embodiment refers to a situation where a collision with an obstacle is difficult to avoid even by steering by the occupant 70. For example, if the time to the collision calculated from the speed and the separation distance of the vehicle 1 is shorter than a predetermined threshold value, determination is made that there is a possibility of a collision, and a positive determination is made in S103. At this time, the collision timing corresponding to the time to the collision is also output by the prediction unit 106. The process proceeds to S104 when a positive determination is made in S103, whereas the actuation control is terminated when a negative determination is made.

Figure 4:
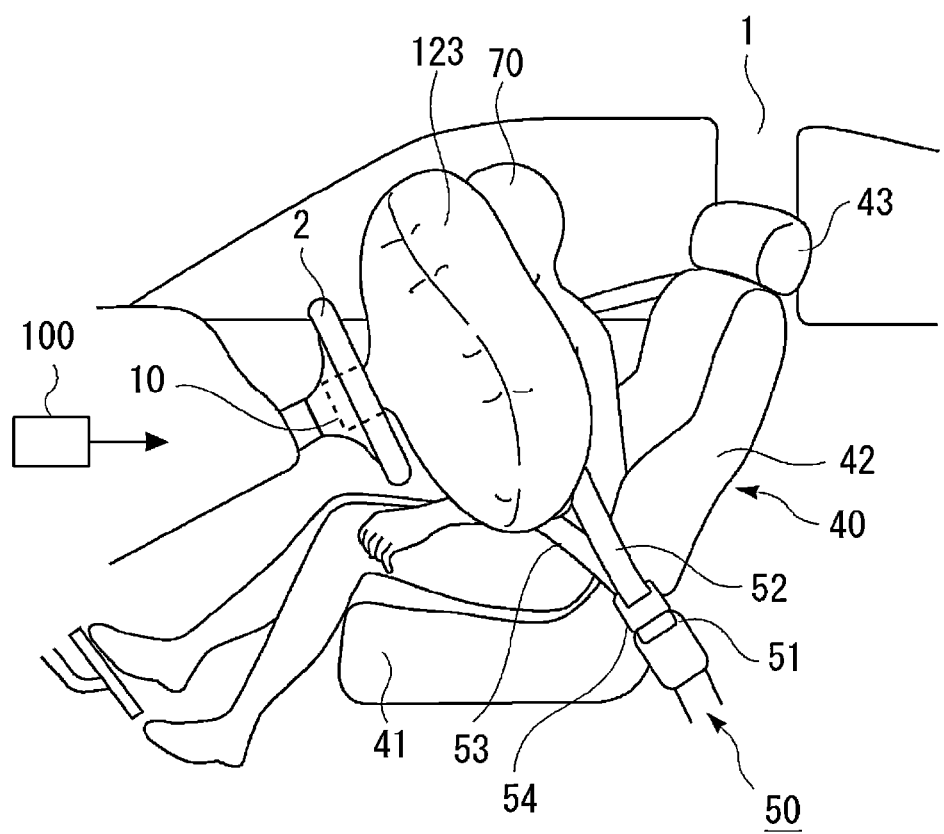
FIG. 4 is a third view illustrating a state of an occupant on board a vehicle.

Next, in S104, the protection pressure is calculated by the calculation unit 104. As illustrated in FIG. 4, the protection pressure is a suitable pressure received by the occupant 70 from the inflated airbag 123 when the airbag device 10 protects the occupant 70 from the impact at the time of collision. That is, if the pressure received from the airbag 123 is too high, excessive impact will be applied to the occupant 70, which is not preferable from the perspective of occupant protection. If the pressure received from the airbag 123 is too weak, it becomes difficult to suitably support the occupant 70 that is blown in the travel direction of the vehicle 1 due to the inertial force at the time of collision, which is also not preferable from the perspective of occupant protection. Therefore, the calculation unit 104 calculates a preferable protection pressure from the perspective of occupant protection based on the inertial force that can be applied. The heavier the weight of the occupant 70 is, and the higher the speed of the vehicle 1 becomes, the greater the inertial force becomes, and thus the calculation unit 104 calculates the protection pressure based on at least one of these parameters. Specifically, the calculation unit 104 calculates the protection pressure, and thus the heavier the weight of the occupant 70 is, the greater the protection pressure becomes.

Subsequently, in S105, the calculation unit 104 calculates protection timing. The protection timing is a timing suitable for protecting the occupant 70 by the airbag device 10, i.e., the timing at which the inflated airbag 123 is brought into contact with the occupant 70 to support the occupant 70 moving with inertial force. Therefore, the protection timing is preferably calculated based on the contact reach time until the body of the occupant 70 moving with inertial force due to the impact at the time of collision comes into contact with the steering wheel 2. For example, the protection timing may be calculated based on the separation distance between the occupant 70 and the steering wheel 2 and the travel speed of the vehicle 1 that are detected by the state detection unit 102. In a case where the protection timing is defined with reference to the collision timing (predicted by the prediction unit 106) (e.g., in a case where the timing after a predetermined time since the collision timing is taken as the protection timing), the calculation is performed, and thus the shorter the separation distance is and the faster the travel speed is, the closer the protection timing gets to the collision timing.

Figure 7:
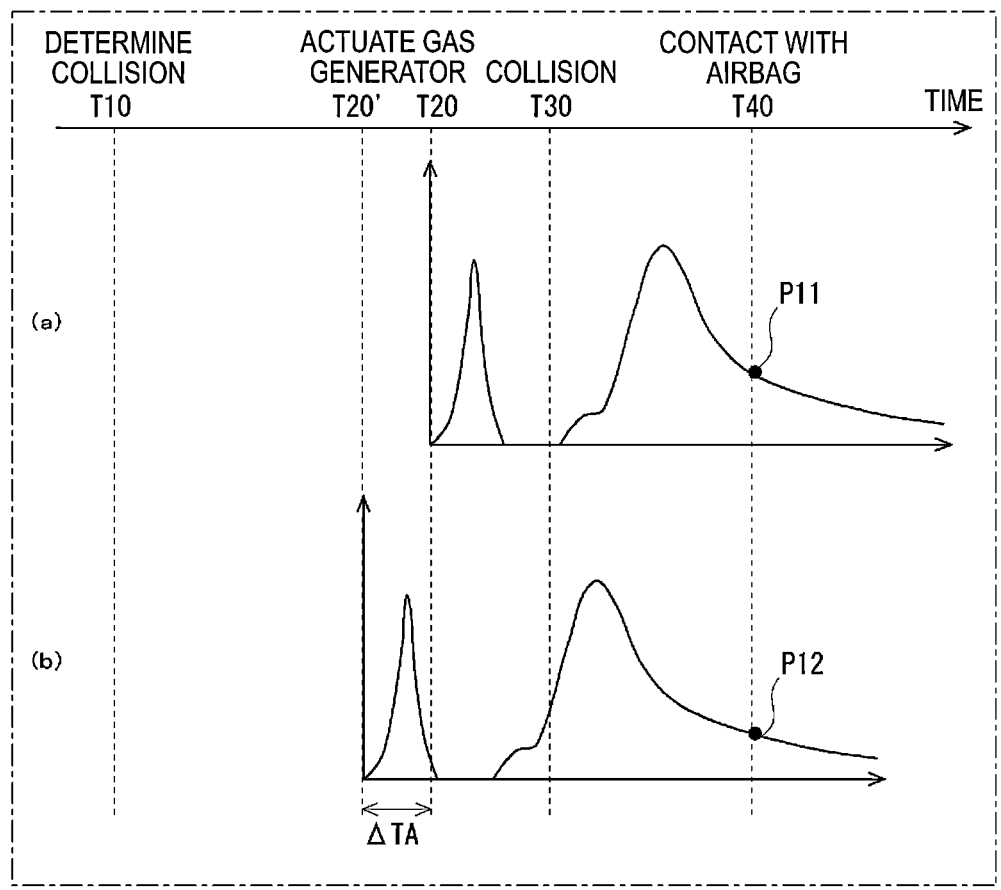
FIG. 7 is a view for explaining a determination process of a timing at which an igniter of an airbag device is actuated in the actuation control illustrated in FIG. 6.

Next, in S106, the actuation timing at which the actuation control unit 105 supplies an ignition signal to the igniter 121 to actuate the gas generator 122 is determined. The flow of the determination of the actuation timing will be described based on FIG. 7. The horizontal axis shown in FIG. 7 is a time axis. In this time axis, timing T10 is a timing at which a collision is predicted by the prediction unit 106, that is, a timing at which a positive determination is made in the process of S103. The collision timing predicted at that time is represented by timing T30, and the protection timing calculated in S105 is represented as timing T40 at which the airbag 123 comes into contact with the occupant 70. Then, the actuation timing at which the gas generator 122 is actuated is represented as timing T20 or T20'.

Here, the upper part (a) of FIG. 7 explains that it is necessary to send an ignition signal to the igniter 121 and to actuate the gas generator 122 at the timing T20, which is earlier than the collision timing T30, to bring the airbag 123 inflated at the timing T40, which is the protection timing, into contact with the occupant 70 (weighing 60 kg) at a protection pressure P11, using the pressure transition shown in FIG. 5. That is, if the occupant 70 is 60 kg in weight, to suitably protect the occupant 70, it is necessary to actuate the gas generator 122 at the timing T20, which is earlier than the collision timing T30. Note that the actuation form of the gas generator 122 illustrated in the upper part (a) has been determined in advance through a prior experiment or the like, and is referred to as a "standard actuation form". Then, it is assumed that the storage unit 107 stores information regarding this standard actuation form, i.e., information regarding that the actuation timing of the gas generator 122 is set to T20 to apply the protection pressure P11 on the occupant 70 at the protection timing T40 after the collision timing T30 (i.e., the timing after T40−T30 since the collision timing T3).

Here, in actual S106, if the occupant 70 is less than 60 kg in body weight, the protection pressure applied to the occupant 70 is calculated to be P12, which is less than P11 (process of S104 described above). In actual S105, the protection timing is calculated as the same timing as in the standard actuation form. In such a case, to apply the protection pressure P12 on the occupant 70 at the protection timing T40, the protection timing T40 needs to be reached at a time point where the pressure in the airbag 123 is further attenuated after the elapse of a longer period of time since the gas generator 122 has been actuated. To do so, compared to the standard actuation form, it is necessary to set the actuation timing of the gas generator 122 earlier by ΔTA and set the actuation timing to T20' (see the lower part (b) of FIG. 7). ΔTA can be calculated in accordance with the protection pressure P12 based on the data of pressure transition stored in the storage unit 107. In view of the actuation timing T20 of the standard actuation form with the thus calculated ΔTA, the actuation timing T20' in S106 is determined. As understood from FIG. 7, this actuation timing T20' is earlier than the collision timing T30 predicted by the prediction unit 106.

Then, when the actuation timing T20' is determined in S106, then in S107, an ignition signal is supplied to the igniter 121 at the actuation timing T20' to achieve the actuation of the gas generator 122. Thus, when the vehicle 1 collides with an obstacle, suitable occupant protection can be achieved by activating the gas generator 122 at an appropriate timing before the collision.

Note that, in the form shown in the lower part (b) of FIG. 7, the travel speed of the vehicle 1 is the same as that of the case corresponding to the standard actuation form, and therefore the protection timing is the same as the protection timing T40 of the case corresponding to the standard actuation form. If the travel speed of the vehicle 1 is faster, the actual protection timing is closer to the collision timing T30 than the protection timing T40 of the case corresponding to the standard actuation form, and the actuation timing T20' of the gas generator 122 is made earlier, and thus the protection pressure P12 is applied on the occupant 70 at the protection timing.

Modified Examples

Figure 8:
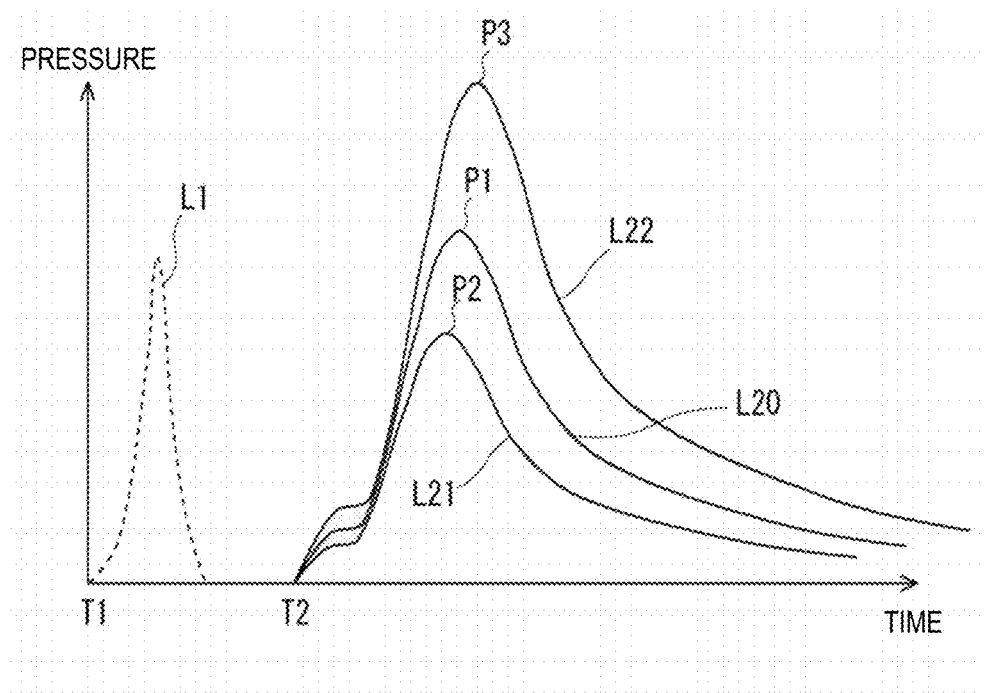
FIG. 8 is a second view showing a transition in gas pressure in the airbag of the airbag device.

Here, a modified example of assumed pressure transition data in the airbag 123 under the operation of the gas generator 122, which is stored in the storage unit 107, will be described based on FIG. 8. The pressure transition data shown in FIG. 8 is related to three forms of pressure transition corresponding to the temperature at which the gas generator 122 is placed. Note that in the present modified example, pressure transition L1 when the airbag 123 comes out from the interior of the steering wheel 2 is omitted, and the pressure transition from and after the timing T2 is stored in the storage unit 107. As the combustion characteristics, the gas generating agent in the gas generator 122 is susceptible to the surrounding temperature (temperature of the gas generator 122). That is, the higher the surrounding temperature becomes, the harder the gas generating agent combusts. Thus, the pressure transition data when the temperatures of the gas generator 122 are at room temperature, low temperature, and high temperature are L20, L21, and L22, respectively. Note that the room temperature pressure transition L20 is identical to the pressure transition L2 shown in FIG. 5. The peak pressures of the pressure transitions L20, L21, and L22 are P1, P2, and P3, respectively.

When such pressure transition data is stored in the storage unit 107, information regarding the standard actuation form is also stored in the storage unit 107 in a manner corresponding to each pressure transition. Furthermore, when the actuation control illustrated in FIG. 6 is performed, in the determination process at the actuation timing in S106, a suitable pressure transition is selected from L20 to L22 based on the temperature of the gas generator 122 at that time, and the actuation timing at that time is determined in accordance with the corresponding standard actuation form. As a result, suitable occupant protection can be achieved without being affected by the temperature of the gas generator 122.

Second Embodiment

Figure 9:
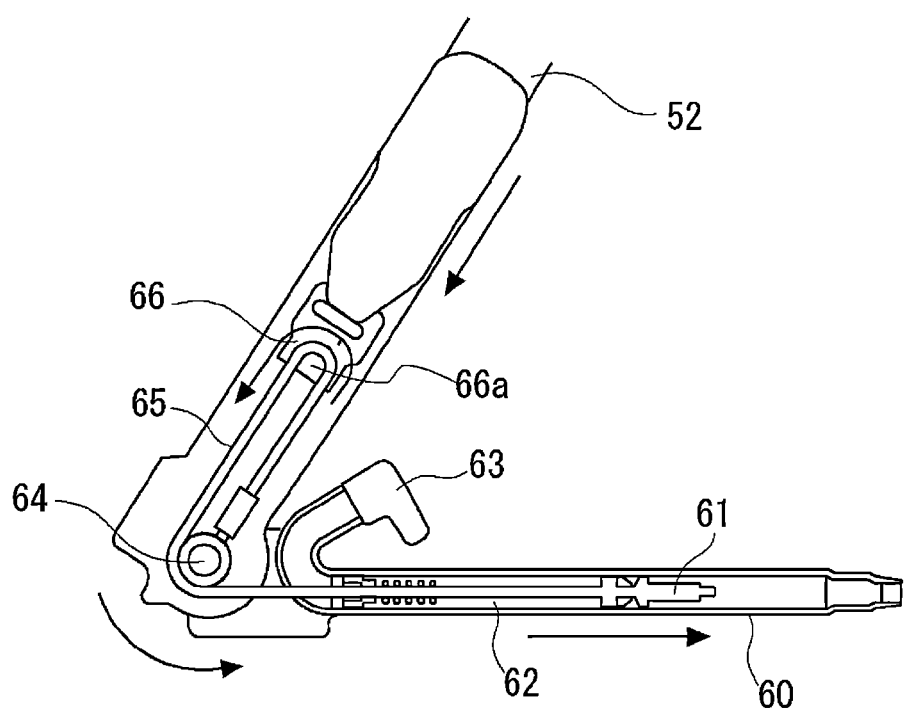
FIG. 9 is a view illustrating a schematic configuration of the seatbelt device.

An occupant protection system according to the second embodiment will be described based on FIG. 9 and FIG. 10. FIG. 9 is a view illustrating a schematic configuration of a pre-tensioner mechanism provided at the end portion of the shoulder strap 52 of the seatbelt device 50. In the present embodiment, in addition to the airbag device 10 described above, the seatbelt device 50 also corresponds to the protection device of the present application. The seatbelt device 50 of the present embodiment is provided with a gas generator 63, and the gas generator 63 includes an igniter for actuation thereof. Then, a metal housing 60 having a predetermined space 62 in which gas generated by the gas generator 63 is supplied is connected to the gas generator 63 at one end portion thereof. Note that the other end portion of the housing 60 communicates with an external space via an opening portion. Then, a piston 61 that can slide in the predetermined space 62 inside the housing 60 is arranged in a straight portion of the housing 60, and the predetermined space 62 into which generated gas is discharged is defined by the end portion of the piston 61, the gas generator 63, and the housing 60. Thus, the volume of the predetermined space 62 varies with the sliding of the piston 61.

Note that, although the pressure inside the predetermined space 62 rises greatly initially when gas flows from the gas generator 63, the piston 61 slides with the pressure rise, and the volume of the predetermined space 62 increases, and thus the internal pressure of the predetermined space 62 is attenuated. Note that one end portion of a wire 65 is connected to an end portion of the piston 61. The wire 65 is wound in a state of being in contact with a rotation shaft 64 and a hook portion 66a provided on an anchor 66 at the end portion of the shoulder strap 52, and the other end thereof is fixed with respect to the rotation shaft 64. Thus, when the piston 61 slides by pressure from the gas, the wire 65 is pulled and the shoulder strap 52 will be pulled in the same manner. At this time, because the shoulder strap 52 is in a state of being hooked by the chest from the shoulder of the occupant 70 (see FIG. 1), sliding of the piston 61 can press the occupant 70 via the shoulder strap 52 and restrain the body to the seat 40.

Such restraint of the body of the occupant 70 by the seatbelt device 50 makes the posture of the occupant 70 with respect to the seat 40 generally constant, contributing to making occupant protection by the airbag device 10 more effective. Therefore, in the present embodiment, to suitably control the pressing on the occupant 70 by the seatbelt device 50, the actuation control of the gas generator 63 provided on the seatbelt device 50 is performed in the same manner as in the first embodiment described above.

Here, the assumed pressure transition data in the predetermined space 62 inside the housing 60 when the gas generator 63 is actuated is also stored in the storage unit 107. The pressure transition is schematically shown in FIGS. 10 (A) and (B). Note that FIG. 10 (A) shows the pressure transition in the standard actuation form of the gas generator 63 of the seatbelt device 50. The difference in the trend between the pressure transition corresponding to the seatbelt device 50 and the pressure transition corresponding to the airbag device 10 lies in that the pressure immediately rises along with the actuation of the gas generator 63 (i.e., there is no transition corresponding to the pressure transition L1 required for the airbag 123 to be inflated from the steering wheel 2).

Now, the actuation control in the present embodiment will be mentioned. As described above, the protection device of the present embodiment includes the airbag device 10 and the seatbelt device 50. Since the actuation control for the airbag device is as described above based on FIG. 6, detailed description thereof (in particular, details on the determination of the time ΔTA shifted from the actuation timing T20 of the gas generator 122 in the standard actuation form shown in FIG. 10) is omitted. Regarding the seatbelt device 50, in S104 of actuation control, an appropriate protection pressure applied on the occupant 70 by the seatbelt device 50 is calculated, i.e., the pressure at which the body can be suitably restrained in the seat 40 within a range where excessive impact is not applied to the occupant 70 is calculated. Also in this case, in view of restraining the body against the inertial force at the time of collision, the protection pressure on the seatbelt device 50 can be calculated based on the weight of the occupant 70 and the like.

In S105, the protection timing for applying the protection pressure to the occupant 70 by the seatbelt device 50, i.e., the timing of restraining the body to the seat 40 by the seatbelt device 50 is calculated. The protection timing of the seatbelt device 50 can be determined according to criteria such as after a certain period of time from the collision timing predicted by the prediction unit 106.

The determination (process in S106) of the actuation timing of the gas generator 63 of the seatbelt device 50 based on the protection pressure and protection timing in the seatbelt device 50 described above will be described based on FIG. 10. Note that the third part (a) and the fourth part (b) shown in FIG. 10 are the same as the upper part (a) and the lower part (b) shown in FIG. 7. In the time axis of FIG. 10, the timings T10, T20, T20', T30, and T40 are as described in the first embodiment. Furthermore, the protection timing in the seatbelt device 50 described above is represented as timing T140 at which the seatbelt device 50 restrains the occupant 70 to the seat 40. Then, the actuation timing at which the gas generator 63 is actuated is represented as timing T120 or T120'.

Figure 10:
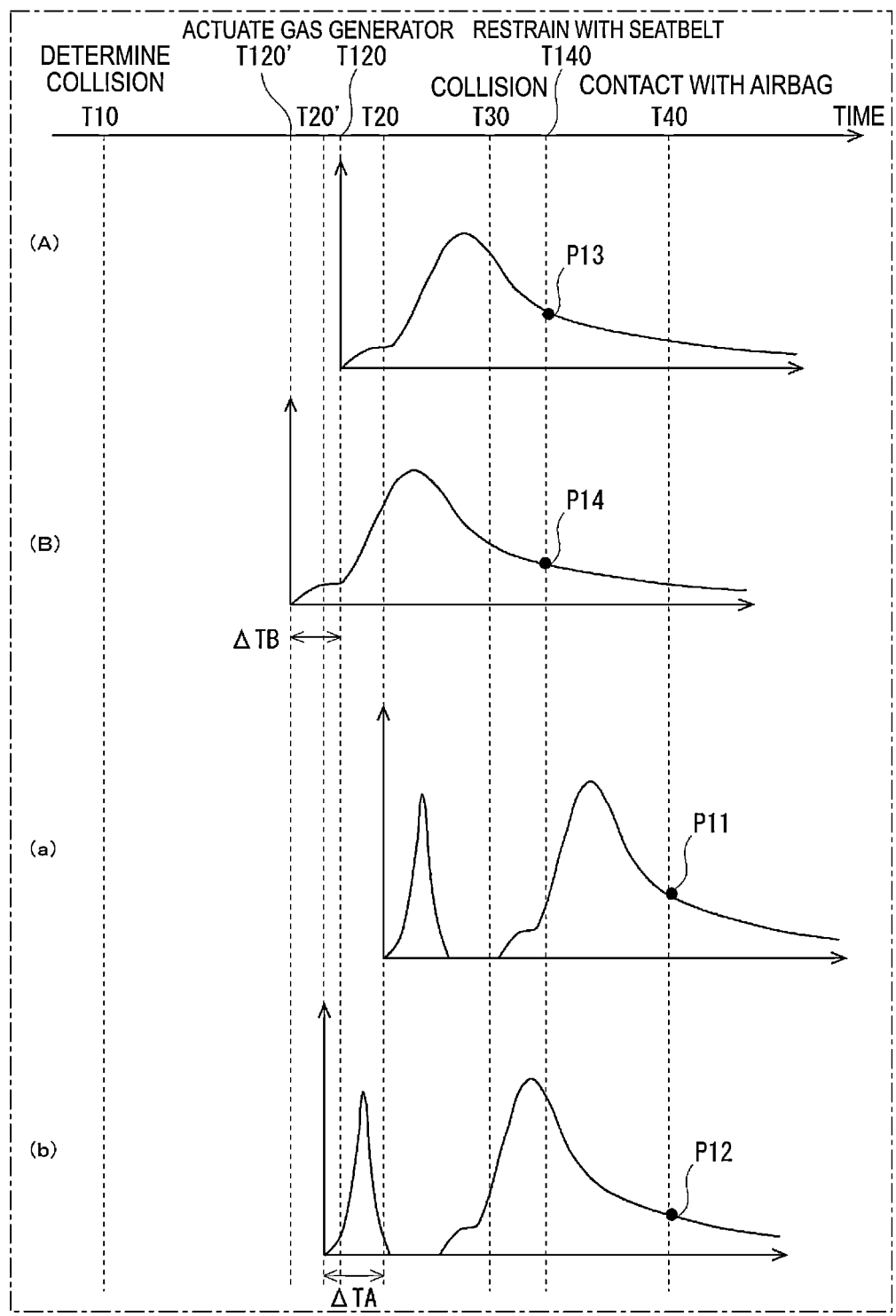
FIG. 10 is a view for explaining a determination process of a timing at which an igniter of an airbag device and an igniter of a seatbelt device are actuated.

Here, the first part (A) of FIG. 10 shows the standard actuation form for the seatbelt device 50, and is determined in advance through a prior experiment or the like. As is the case with the standard actuation form for the airbag device 10 (third part (a) of FIG. 10), the condition is described such that the weight of the occupant 70 is 60 kg and, to suitably restrain the body of the occupant 70 to the seat 40 before the airbag 123 is fully inflated, it is necessary to send an ignition signal to the igniter of the gas generator 63 and actuate the gas generator 63 at a timing T120, which is earlier than the collision timing T30. The timing T120 is earlier than the actuation timing T20 in the airbag device 10. Then, it is assumed that the storage unit 107 stores information regarding this standard actuation form, i.e., information regarding that the actuation timing of the gas generator 63 is set to T120 to apply the protection pressure P13 on the occupant 70 at the protection timing T140 after the collision timing T30 (i.e., the timing after T140-T30 since the collision timing T3).

Here, as in the first embodiment, in actual S106, if the occupant 70 is less than 60 kg in body weight, the protection pressure applied to the occupant 70 by the seatbelt device 50 is calculated to be P14, which is less than P13. In actual S105, the protection timing in the seatbelt device 50 is calculated as the same timing as in the standard actuation form. In such a case, to apply the protection pressure P14 on the occupant 70 at the protection timing T140, the protection timing T140 needs to be reached at a time point where the pressure in the predetermined space 62 is further attenuated after the elapse of a longer period of time since the gas generator 63 of the seatbelt device 50 has been actuated. To do so, compared to the standard actuation form shown in the first part (A) of FIG. 10, it is necessary to set the actuation timing of the gas generator 63 earlier by ΔTB and set the actuation timing to T120' (see the second part (B) of FIG. 10). ΔTB can be calculated in accordance with the protection pressure P14 based on the data of pressure transition stored in the storage unit 107. In view of the actuation timing T120 of the standard actuation form with the thus calculated ΔTB, the actuation timing T120' of the gas generator 63 of the seatbelt device 50 is determined. As understood from FIG. 10, this actuation timing T120' is a timing that is earlier than the collision timing T30 predicted by the prediction unit 106 and a timing that is earlier than the actual actuation timing T20' of the gas generator 122 of the airbag device 10.

Then, when the actuation timing T120' is determined in S106 together with the actuation timing T20' for the airbag device 10, then in S107, first, in the seatbelt device 50, an ignition signal is supplied to the igniter of the gas generator 63 at the actuation timing T120' to achieve the actuation of the gas generator 63, and thereafter, an ignition signal is supplied to the igniter 121 at the actuation timing T20' to achieve the actuation of the gas generator 122. Thus, when the vehicle 1 collides with an obstacle, suitable occupant protection can be achieved by activating each of the gas generator 63 and the gas generator 122 at an appropriate timing before the collision.

Note that in the first and second examples described above, protection of the occupant 70 seated in the seat 40 on the driver's seat side has been described, but the present embodiment can also be applied to protection of the occupant 70 seated in the seat on the passenger seat side, for example. In this case, as information related to the state of the occupant 70 in the vehicle 1, the state detection unit 102 detects information related to the weight of the occupant 70 and the separation distance between the occupant 70 and the dashboard or the window screen. The former is related to inertial force generated when the vehicle 1 collides with an obstacle, the latter is related to the contact reach time between the occupant 70 and the dashboard and the window screen when a collision occurs. Furthermore, the present embodiment may also be applied to a protection system for an occupant of another seat (e.g., rear seat) of the vehicle.

Other Embodiments

In the first embodiment, a configuration in which only the airbag device 10 is included as a protection device that protects the occupant 70 is disclosed. In the second embodiment, a configuration in which the airbag device 10 and the seatbelt device 50 are included as protection devices is disclosed. Other than these configurations, a configuration in which only the seatbelt device 50 is included as the protection device or a configuration in which another device is included also belong to the scope of the disclosure of the present description. In any protection device, the gas generator for activating the protection device is provided, and the protection pressure applied on the occupant 70 via the protection device using the generated gas and the protection timing thereof can be sufficiently understood by a person ordinary skilled in the art based on the disclosure of the present application above. Each embodiment disclosed in the present description can be combined with each of the features disclosed in the present description.

REFERENCE SIGNS LIST

1: Vehicle
2: Steering wheel
10: Airbag device
40: Seat
50: Seatbelt device
60: Housing
61: Piston
62: Predetermined space
63: Gas generator
70: Occupant
100: Control device
101: Acquiring unit
102: State detection unit
103: Control unit
104: Calculation unit
105: Actuation control unit
106: Prediction unit
107: Storage unit
121: Igniter
122: Gas generator
123: Airbag
130: Vehicle information acquiring unit
140: Sensor

The invention claimed is:

1. An occupant protection system protecting an occupant in a vehicle by a protection device provided in the vehicle, the occupant protection system comprising:
a gas generator including an igniter ignited by an ignition signal and generating gas due to actuation of ignition of the igniter, the gas generator configured to actuate the protection device with gas generated by the gas generator;
a prediction unit configured to predict a collision between the vehicle and an obstacle present around the vehicle; and
a control unit configured to control supply of the ignition signal to the igniter based on a prediction result by the prediction unit,
the protection device being configured to be actuated via a pressure applied to a predetermined space with gas generated by the gas generator and fed into the predetermined space in the protection device, and
the control unit including,
a calculation unit configured to calculate a protection pressure applied on the occupant by the protection device to protect the occupant and to calculate a protection timing at which the protection pressure is applied on the occupant, and
an actuation control unit configured to actuate the gas generator at an actuation timing earlier than a collision timing predicted by the prediction unit in a manner that the protection pressure is applied at the protection timing by the protection device based on pressure data related to a pressure transition of the gas in the predetermined space when the ignition signal is supplied to the igniter,
wherein the data related to the pressure transition is stored in a storage unit, and
wherein a suitable pressure transition is selected based on a temperature of the of the gas generator such that the actuation control unit actuates the gas generator at the actuation timing based on the temperature of the gas generator.

2. The occupant protection system according to claim 1, wherein the pressure data includes data related to a peak timing in which the pressure of the gas in the predetermined space reaches a peak value after the ignition signal is supplied to the igniter and the pressure transition in the predetermined space at and after the peak timing.

3. The occupant protection system according to claim 1, wherein
the pressure data is formed as data related to the pressure transition of the gas in the predetermined space in a manner corresponding to a temperature of the gas generator.

4. The occupant protection system according to claim 1, wherein the calculation unit calculates the protection pressure based on a weight of the occupant.

5. The occupant protection system according to claim 1, wherein
the protection device is an airbag device supplied with gas generated by the gas generator and inflated into a predetermined inflation shape,
the predetermined space is an inflation space in the airbag device,
the pressure data is related to the pressure transition of the gas in the inflation space,
the calculation unit calculates the protection pressure applied on the occupant when the airbag device is inflated into the predetermined inflation shape and comes into contact with the occupant, and calculates the protection timing for the airbag device to come into contact with the occupant, and
the actuation control unit actuates the gas generator at the actuation timing based on the protection timing and the pressure data.

6. The occupant protection system according to claim 5, wherein the actuation control unit actuates the gas generator at the actuation timing further based on a travel speed of the vehicle.

7. The occupant protection system according to claim 1, wherein
the protection device is a seatbelt device restraining the occupant to a seat by pulling a seatbelt with the gas generated and supplied by the gas generator,
the predetermined space is a pressure space in which pressure is applied with the gas to cause the seatbelt to apply a restraining force on the occupant,
the pressure data is related to a pressure transition of gas in the pressure space,
the calculation unit calculates the protection pressure applied on the occupant when the seatbelt restrains the occupant to the seat by applying pressure with the gas, and calculates the protection timing for the seatbelt to restrain the occupant, and
the actuation control unit actuates the gas generator at the actuation timing based on the protection timing and the pressure data.

8. The occupant protection system according to claim 7, further comprising:
a second gas generator including a second igniter ignited by a second ignition signal, and configured to generate gas due to actuation of ignition of the second igniter and to actuate an airbag device via a pressure applied to an inflation space with gas generated by the second gas generator and being fed into the inflation space in the airbag device, wherein:
the occupant protection system is further configured to protect the occupant with the airbag device inflated into a predetermined inflation shape,
the control unit controls supply of the ignition signal to the igniter and the second ignition signal to the second igniter, based on the prediction result from the prediction unit,
the calculation unit further calculates a second protection pressure applied on the occupant when the airbag device is inflated into the predetermined inflation shape and comes into contact with the occupant, and calculates a second protection timing for the airbag device to come into contact with the occupant, and
the actuation control unit actuates the gas generator at the actuation timing based on the pressure data in a manner that the protection pressure is applied on the occupant by the seatbelt at the protection timing after the collision timing and before the second protection timing, and further actuates the second gas generator at a second actuation timing based on second pressure data related to a pressure transition of gas in the inflation space when the second ignition signal is supplied to the second igniter, in a manner that the airbag device and the occupant come into contact with each other at the second protection timing to apply the second protection pressure on the occupant.

9. The occupant protection system according to claim 8, wherein the actuation timing and the second actuation timing are both timings before the collision timing, and the actuation timing is a timing earlier than the second actuation timing.

10. The occupant protection system according to claim 2, wherein
the pressure data is formed as data related to the pressure transition of the gas in the predetermined space in a manner corresponding to a temperature of the gas generator.

11. The occupant protection system according to claim 2, wherein the calculation unit calculates the protection pressure based on a weight of the occupant.

12. The occupant protection system according to claim 3, wherein the calculation unit calculates the protection pressure based on a weight of the occupant.

13. The occupant protection system according to claim 2, wherein
the protection device is an airbag device supplied with gas generated by the gas generator and inflated into a predetermined inflation shape,
the predetermined space is an inflation space in the airbag device,
the pressure data is related to the pressure transition of the gas in the inflation space,
the calculation unit calculates the protection pressure applied on the occupant when the airbag device is inflated into the predetermined inflation shape and comes into contact with the occupant, and calculates the protection timing for the airbag device to come into contact with the occupant, and
the actuation control unit actuates the gas generator at the actuation timing based on the protection timing and the pressure data.

14. The occupant protection system according to claim 3, wherein
the protection device is an airbag device supplied with gas generated by the gas generator and inflated into a predetermined inflation shape,
the predetermined space is an inflation space in the airbag device,
the pressure data is related to the pressure transition of the gas in the inflation space,
the calculation unit calculates the protection pressure applied on the occupant when the airbag device is inflated into the predetermined inflation shape and comes into contact with the occupant, and calculates the protection timing for the airbag device to come into contact with the occupant, and
the actuation control unit actuates the gas generator at the actuation timing based on the protection timing and the pressure data.

15. The occupant protection system according to claim 4, wherein
the protection device is an airbag device supplied with gas generated by the gas generator and inflated into a predetermined inflation shape,
the predetermined space is an inflation space in the airbag device,
the pressure data is related to the pressure transition of the gas in the inflation space,
the calculation unit calculates the protection pressure applied on the occupant when the airbag device is inflated into the predetermined inflation shape and comes into contact with the occupant, and calculates the protection timing for the airbag device to come into contact with the occupant, and
the actuation control unit actuates the gas generator at the actuation timing based on the protection timing and the pressure data.

16. The occupant protection system according to claim 2, wherein the protection device is a seatbelt device restraining the occupant to a seat by pulling a seatbelt with the gas generated and supplied by the gas generator, the predetermined space is a pressure space in which pressure is applied with the gas to cause the seatbelt to apply a restraining force on the occupant, the pressure data is related to a pressure transition of gas in the pressure space, the calculation unit calculates the protection pressure applied on the occupant when the seatbelt restrains the occupant to the seat by applying pressure with the gas, and calculates the protection timing for the seatbelt to restrain the occupant, and the actuation control unit actuates the gas generator at the actuation timing based on the protection timing and the pressure data.

17. The occupant protection system according to claim 3, wherein the protection device is a seatbelt device restraining the occupant to a seat by pulling a seatbelt with the gas generated and supplied by the gas generator, the predetermined space is a pressure space in which pressure is applied with the gas to cause the seatbelt to apply a restraining force on the occupant, the pressure data is related to a pressure transition of gas in the pressure space, the calculation unit calculates the protection pressure applied on the occupant when the seatbelt restrains the occupant to the seat by applying pressure with the gas, and calculates the protection timing for the seatbelt to restrain the occupant, and the actuation control unit actuates the gas generator at the actuation timing based on the protection timing and the pressure data.

18. The occupant protection system according to claim 4, wherein the protection device is a seatbelt device restraining the occupant to a seat by pulling a seatbelt with the gas generated and supplied by the gas generator, the predetermined space is a pressure space in which pressure is applied with the gas to cause the seatbelt to apply a restraining force on the occupant, the pressure data is related to a pressure transition of gas in the pressure space, the calculation unit calculates the protection pressure applied on the occupant when the seatbelt restrains the occupant to the seat by applying pressure with the gas, and calculates the protection timing for the seatbelt to restrain the occupant, and the actuation control unit actuates the gas generator at the actuation timing based on the protection timing and the pressure data.

19. A method of protecting an occupant in a vehicle by a protection device via an occupant protection system, the method comprising:

actuating a gas generator thereby generating gas, wherein the gas generator comprises an igniter and the igniter is ignited by an ignition signal;

predicting a collision via a prediction unit, wherein the prediction unit predicts a collision between the vehicle and an obstacle present around the vehicle;

operating a control unit comprising a calculation unit and an actuation control unit to control supply of the ignition signal to the igniter, wherein the control unit controls the ignition signal based on a prediction result by the prediction unit, wherein the calculation unit calculates a protection pressure applied on the occupant by the protection device to protect the occupant and calculate a protection timing;

operating the actuation control unit thereby actuating the gas generator, wherein the actuation control actuates the gas generator at an actuation timing earlier than a collision timing predicted by the prediction unit in a manner that the protection pressure is applied at the protection timing by the protection device based on pressure data related to a pressure transition of the gas in the predetermined space when the ignition signal is supplied to the igniter, storing the pressure transition in a storage unit, selecting a suitable pressure transition based on a temperature of the of the gas generator such that the actuation control unit actuates the gas generator at the actuation timing based on the temperature of the gas generator, and actuating the protection device via a pressure applied to a predetermined space with gas generating by the gas generator and fed into the predetermined space in the protection device.

20. The method of claim 19, wherein the occupant protection system further comprises:

a second gas generator including a second igniter ignited by a second ignition signal, and configured to generate gas due to actuation of ignition of the second igniter and to actuate an airbag device via a pressure applied to an inflation space with gas generated by the second gas generator and being fed into the inflation space in the airbag device, wherein:

the occupant protection system is further configured to protect the occupant with the airbag device inflated into a predetermined inflation shape, the control unit controls supply of the ignition signal to the igniter and the second ignition signal to the second igniter, based on the prediction result from the prediction unit, the calculation unit further calculates a second protection pressure applied on the occupant when the airbag device is inflated into the predetermined inflation shape and comes into contact with the occupant, and calculates a second protection timing for the airbag device to come into contact with the occupant, and the actuation control unit actuates the gas generator at the actuation timing based on the pressure data in a manner that the protection pressure is applied on the occupant by the seatbelt at the protection timing after the collision timing and before the second protection timing, and further actuates the second gas generator at a second actuation timing based on second pressure data related to a pressure transition of gas in the inflation space when the second ignition signal is supplied to the second igniter, in a manner that the airbag device and the occupant come into contact with each other at the second protection timing to apply the second protection pressure on the occupant.

* * * * *